July 29, 1952 V. C. HALL ET AL 2,605,348

COLOR SEPARATION NEGATIVE

Filed March 10, 1948 4 Sheets-Sheet 1

INVENTORS.
VINCENT C. HALL
WILLIAM WEST MOE
BY
Campbell, Brumbaugh & Moe
THEIR ATTORNEYS.

COLOR SEPARATION NEGATIVE

Filed March 10, 1948 4 Sheets-Sheet 2

INVENTORS.
VINCENT C. HALL
WILLIAM WEST MOE
BY
Campbell, Brumbaugh & Free
THEIR ATTORNEYS.

INVENTORS.
VINCENT C. HALL
WILLIAM WEST MOE
BY
Campbell, Brumbaugh & Free
THEIR ATTORNEYS.

July 29, 1952 V. C. HALL ET AL 2,605,348

COLOR SEPARATION NEGATIVE

Filed March 10, 1948 4 Sheets-Sheet 4

INVENTORS.
VINCENT C. HALL
WILLIAM WEST MOE
BY
Campbell, Brumbaugh & Free
THEIR ATTORNEYS.

Patented July 29, 1952

2,605,348

UNITED STATES PATENT OFFICE 2,605,348

COLOR SEPARATION NEGATIVE

Vincent C. Hall, Stamford, and William W. Moe, Stratford, Conn., assignors to Time, Incorporated, New York, N. Y., a corporation of New York Application March 10, 1948, Serial No. 14,008

18 Claims. (Cl. 178—5.2)

The present invention relates to the reproduction of subjects in color. More particularly, it has to do with new and improved methods and apparatuses for preparing a so-called "black printer" for use in making four color reproductions from colored originals.

While it is theoretically possible to produce any color by combining inks of the three subtractive primary colors, yellow, magenta and cyan, in proper proportions, it is generally preferred, in printing color reproductions, to use the three primaries and black. Deficiencies in the three primary colored inks make this desirable. Also, it is easier to produce a good black color with a true black ink than by combining proper amounts of the substractive primaries, and black ink is considerably cheaper than colored inks.

Four color reproduction work requires the preparation from the colored original of four color separation negatives corresponding to the three substractive primary colors and black, the latter negative usually being designated the "black printer." Attempts have been made, heretofore, to produce a "black printer" by electronic means. These efforts have not been particularly successful, however, primarily because they could not accurately produce a "black printer" in accordance with theoretical requirements.

The principal object of the present invention, accordingly, is to provide new and improved methods and apparatuses for producing electronically, from a colored original, a "black printer" that is substantially in conformity with theory.

Another object of the invention is to provide new and improved methods and apparatuses of the above character for simultaneously producing electronically, from a colored original, four color separation negatives, corresponding to three primary colors and black, that are color corrected essentially in accordance with theoretical considerations.

Still another object of the invention is to produce four color reproductions by utilizing a "black printer" representing accurately a portion of the black in the original, the remainder of the black being provided by the three color separation negatives corresponding to the three subtractive primaries.

For a better understanding of the invention, reference is made to the following detailed description of several representative embodiments, taken in conjunction with the accompanying drawings, in which:

Figs. 1*a*, 1*b* and 2 are graphs illustrating some of the principles on which the invention is based;

As stated, any color can be reproduced by combining proper amounts of inks of the subtractive primary colors. Thus, in Fig. 1*a* a given color can be produced by combining yellow, magenta and cyan inks of densities indicated by the ordinates of the three columns shown in the figure. In such a color, the only function served by the color component of minimum density (cyan in Fig. 1*a*) is to combine with equal amounts of the other two colored inks to form a gray in the final colored reproduction.

In a four color system, part or all of the grays and blacks in the original are printed by black ink instead of by equal amounts of inks of the three subtractive primary colors. Thus, the color represented by Fig. 1*a* can be produced in a four color system by only two colors and black. This may be accomplished (Fig. 1*b*) by substituting black ink for the ink of minimum density (cyan in Fig. 1*b*) and reducing the other two colored inks by the amount of black used.

As is known, the density values in the four color separation negatives for a four color system must vary inversely with the amounts of ink of the three substractive primary colors and black to be laid down in the final print. Thus, where the colored original is light or relatively transparent, the amount of ink or dye of any color to be printed is small, and the densities of the color separation negatives must be relatively high to accomplish this. In general, the scanning systems employed provide electric currents proportional to the additive primary colors, red, blue and green in the original. Thus, the color separation negative produced by exposure to exposure devices excited in proportion to these currents will meet the requirements stated.

Figures 1A, 1B:
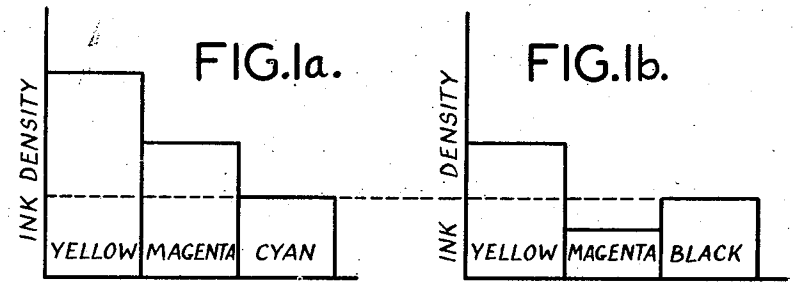
Figure 2:
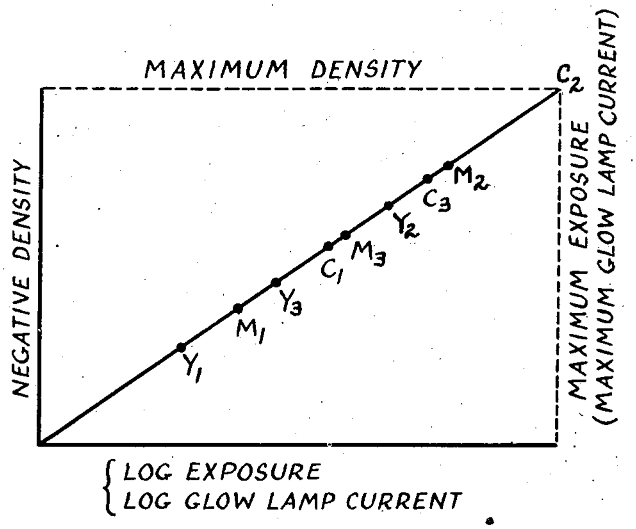

Fig. 2 shows a representative characteristic curve for both three color and four color separation negatives for printing the color represented in Figs. 1*a* and 1*b*, respectively. In Fig. 2, the negative density is plotted against both the logarithm of the exposure and the logarithm of the current intensity used in the device for exposing the negative, which may be a conventional glow lamp, for example. Since all three-color separation negatives should have the same scale, only one curve is shown on which have been placed points corresponding to arbitrary final values of the yellow, magenta and cyan inks to be used in making a print. Thus, the points $C_1$, $M_1$ and $Y_1$ represent the cyan, magenta and yellow negative densities required to reproduce the color in a three color system, while $C_2$, $M_2$ and $Y_2$ represent the corresponding negative densities for a four color system including a full black negative. Also shown is the maximum density, corresponding to the maximum transmission of the colored original where no ink (or only a minimum amount) is to be laid down in the print.

If the color represented by Fig. 1*a* is printed by a three color system, the value of cyan ink will be a minimum in the final print, but the density of the cyan negative will be a maximum. On the other hand, if the color represented by Fig. 1*a* is to be reproduced by a four color system including black, black ink should be substituted for the cyan, and the amounts of yellow and magenta inks should be correspondingly reduced. To accomplish this, the density of the cyan negative should be increased to the maximum, and the densities of the yellow and magenta negatives should also be increased, while the density of the black negative should be correspondingly reduced.

In mathematical terms, the amount $\Delta$ D by which the densities of the cyan, magenta and yellow negatives must be increased in a four color system is:

$$\Delta D = D \text{ max.} - D \text{ color max.} \qquad (1)$$

where D max. is the maximum negative density corresponding to the maximum transmission of the colored original, and D color max. is the negative density corresponding to the maximum additive or minimum subtractive primary component in the original. Therefore, the density of any color separation negative will be given by:

$$D \text{ corrected} = D \text{ uncorrected} + (D \text{ max.} - D \text{ color max.}) \qquad (2)$$

The equation of the characteristic curve shown in Fig. 2 is:

$$\begin{aligned} \text{Density} &= \gamma \log \text{exposure} + \text{constant} \\ &= \gamma \log \text{glow lamp current} + \text{constant}_1 \\ &= \gamma \log I + C_1 \qquad (3) \end{aligned}$$

Substituting Equation 3 in Equation 2:

$$\text{Log } I \text{ corrected} = \log I \text{ uncorrected} + \log I \text{ max.} - \log I \text{ color max.}$$

$$\text{or, } I \text{ corrected} = \frac{I \text{ uncorrected} \times I \text{ max.}}{I \text{ color max.}} \qquad (4)$$

In accordance with the invention, an electronic color reproduction system is provided in which the glow lamp or other exposure device for each of the three color separation negatives is energized by a corrected current of the form given by Equation 4 above, while the exposure device for the black negative is energized by a current proportional to I color max. A typical electronic color reproduction system of this character is illustrated in Figs. 3 and 4 of the drawings.

Figure 3:
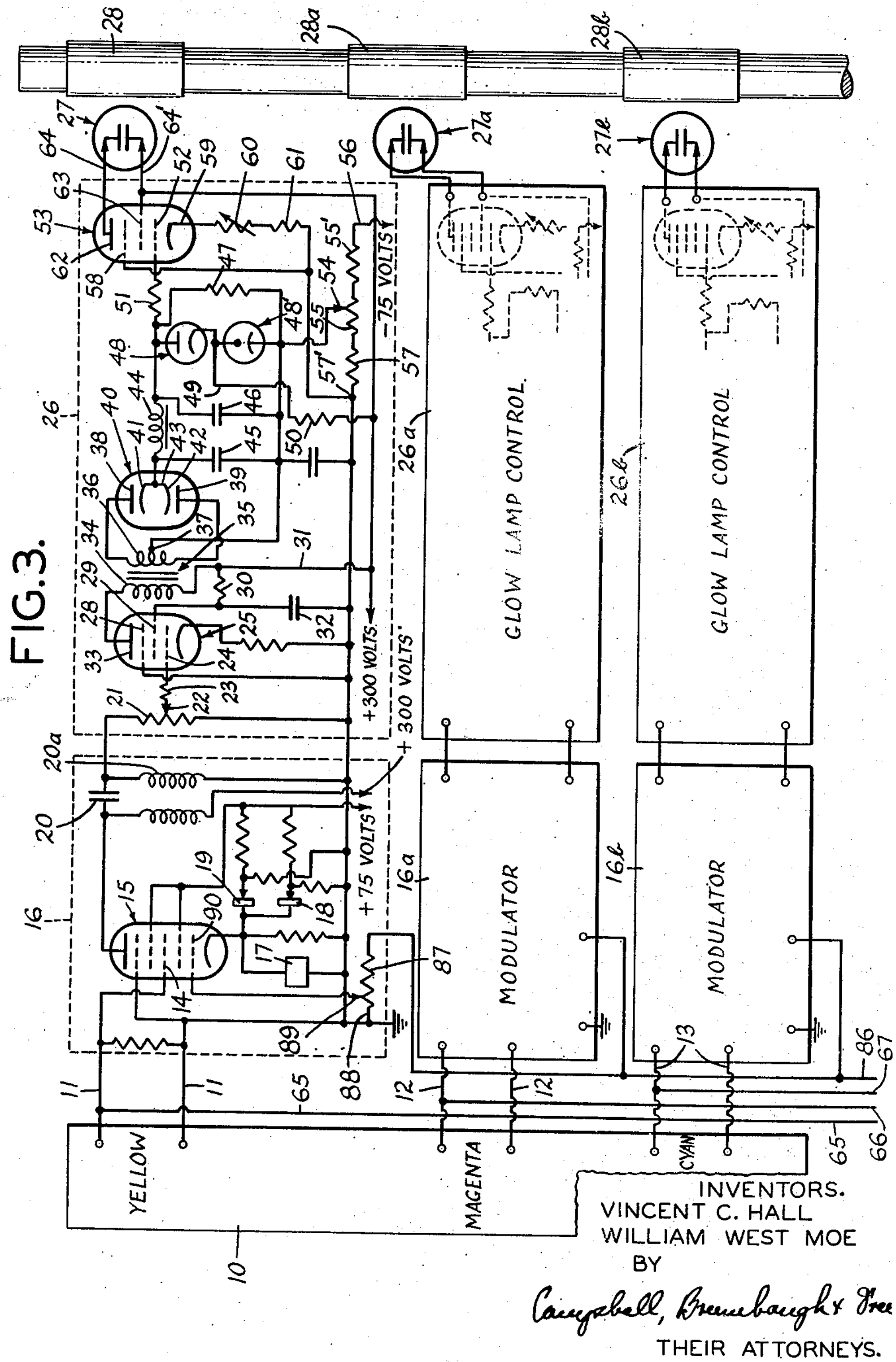
Fig. 3 is a schematic diagram of a portion of a typical electronic color reproduction system constructed according to the invention.
Figure 4:
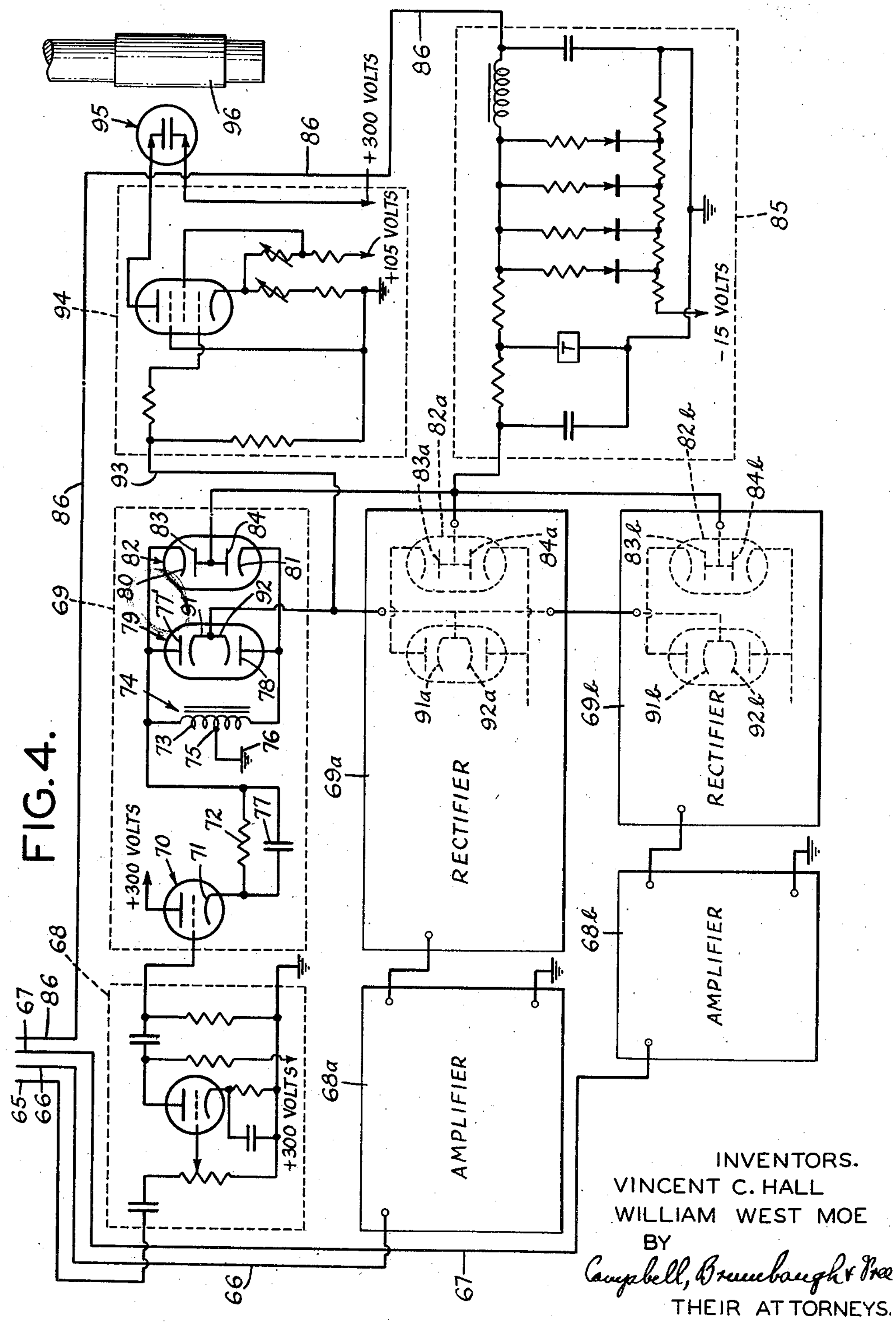
Fig. 4 is a schematic diagram of another part of the system shown in Fig. 3.

In Figs. 3 and 4, an electronic scanning system is provided for supplying three electrical signals proportional to the three additive primary color components to be laid down in the final print. These three electrical signals are fed into a network which is designed to provide a signal output corresponding in value to the strongest of the three input signals. This strongest signal corresponds to (I color max.) of Equation 4 above and it is fed to a compressor network, the output of which controls modulator means in three channels corresponding to the three primary colors, which provide three current outputs of the form given by Equation 4 above.

Referring now to Fig. 3 of the drawings, the scanning system 10 may be of any conventional type which is adapted to scan a colored original and to provide three signal outputs corresponding to the three subtractive primary color components to be laid down in the final print. Thus, the scanning system 10 may provide signal outputs at the conductors 11, 12 and 13, respectively, corresponding to the yellow, magenta and cyan color components to be printed. The three electrical signals may or may not be color corrected in any known manner, such as by masking, for example, as desired.

Each of the three signals preferably comprises an A. C. carrier signal modulated in accordance with variations in a color of the original. The frequency of the carrier signals may be, for example, 7680 cycles per second and the modulating signals may vary from 0-1000 cycles per second in frequency.

Since the three channels representing the three subtractive primary colors are substantially identical in construction, it will be necessary to describe only the channel for the yellow signal in detail, corresponding parts of the channels for the magenta and cyan signals being designated by corresponding reference characters with the subscripts *a* and *b*, respectively.

The respective terminals 11 of the scanning system 10, at which the yellow signal appears are connected to ground and the grid 14, respectively, of any suitable modulator type tube 15, such as a conventional type 6SA7 radio tube, for example. The modulator tube 15 forms part of a modulator 16 which is preferably of the type disclosed in the copending application of William West Moe, Serial No. 763,049, filed July 23, 1947, now Patent No. 2,548,901, for Linear Modulator. Modulator systems of this type utilize suitable means, such as, for example, a thyrite resistor 17 and biased crystal diodes 18 and 19 in the cathode circuit of the tube 15 to insure a linear relationship between output and input over a wide range.

The output of the modulator tube 15 is preferably filtered by any suitable means, such as, for example, a high pass filter comprising the series condenser 20 and the shunt inductance 20*a*, and is impressed upon a potentiometer 21 which serves as a gain control. The variable contact 22 of the potentiometer 21 is connected through a resistor 23 to the control grid 24 of an electronic tube 25 in a control system 26. The control system 26 controls the current supplied to a glow lamp 27 or other device for exposing the yellow color separation negative 28 as described in greater detail hereinafter.

The suppressor grid 28 of the tube 25 is connected to ground as shown, while the screen grid 29 is connected through a resistor 30 and the conductor 31 to the positive terminal of the plate voltage supply (not shown), a bypass condenser 32 being connected between the screen grid 29 and ground, as shown. The plate electrode 33 of the tube 25 is connected to the plate supply conductor 31 through the primary winding 34 of a transformer 35, the secondary winding 36 of which is provided with a mid tap 37.

The outer ends of the secondary winding 36 of the transformer 35 are connected to the anodes 38 and 39, respectively, of a conventional full wave rectifier 40, the cathodes 41 and 42 of which are connected together and to the conductor 43. The output of the rectifier 40 is taken off at the conductor 43 and the mid tap 37 of the transformer secondary winding 36 in the usual manner and is fed through a conventional low-pass filter comprising the series inductance 44 and the shunt condensers 45 and 46 to a load resistor 47.

A conventional, voltage biased diode rectifier 40 is connected in parallel with the load resistor 47 and it serves to limit signals impressed on the load resistor 47 to the desired I max. value. Bias for the diode 48 may be provided by inserting in series with it a conventional voltage regulator 48' which may be connected by a conductor 49 and series resistor 50 to the positive terminal of the plate voltage supply (not shown), for example.

The voltage developed across the load resistor 47 is fed through a series resistor 51 to the control grid 52 of a conventional electronic tube 53 which is connected as a conventional D. C. amplifier. Bias for the tube 53 may be provided by connecting the lower end of the resistor 47 to the variable contact 54 on a potentiometer 55, one terminal of which is connected through a resistor 55' and a conductor 56 to the negative pole of a suitable source of biasing voltage (not shown) and the other terminal of which is connected through a resistor 57 to ground at 57', as shown.

The suppressor grid 58 of the tube 53 may be connected to ground, as shown, and the cathode 59 may be connected through a variable resistor 60, which provides a degenerative control, and a conventional cathode biasing resistor 61 to ground. The plate electrode 62 of the tube 53 is connected by a conductor 64 to one terminal of the glow lamp 27, the other terminal of which is connected to the conductor 64' which leads to the positive terminal of a suitable power supply (not shown). The screen grid electrode 63 of the tube 53 is also connected to the power supply lead 64'.

In order to excite the glow lamps 27, 27$a$ and 27$b$ with currents in accordance with Equation 4 above, it is necessary to supply to the modulators 16, 16$a$ and 16$b$, respectively, a signal proportional to $$\left(1-\frac{1}{I\ \text{color max.}}\right)$$

This signal may be provided by means of an electrical system of the type shown in greater detail in Fig. 4, comprising three channels corresponding to the three primary colors, respectively. The three channels include the amplifiers 68, 68$a$ and 68$b$, respectively, which receive as inputs the yellow, magenta and cyan signals, respectively, through the conductors 65, 66 and 67 (Figs. 3 and 4). The three channels are substantially identical and it will be necessary, therefore, to describe only the yellow channel in detail, corresponding parts of elements in the other two channels being designated by corresponding reference characters with the subscripts $a$ and $b$, respectively.

The amplifier 68 may be any conventional type of alternating current amplifier capable of transmitting the yellow signal, which may be a carrier of, say 7680 cycles per second, modulated by signals in the frequency range of from 0–1000 cycles per second as stated above. The amplified output from the amplifier 68 is fed to a rectifier system 69 which includes a cathode follower comprising a conventional triode 70. The cathode 71 of the triode 70 is connected in series with a cathode biasing resistor 72 and in series with one part 73 of an auto transformer winding 74, the mid tap 75 of which is grounded at 76. The biasing resistor 72 is preferably by-passed by means of a condenser 77, as shown.

The output from the outer terminals of the auto transformer 74 is fed to the anodes 77' and 78 of a conventional full wave rectifier 79. The anodes 77' and 78 of the full wave rectifier 79 are also connected to the cathodes 80 and 81, respectively, of a second conventional full wave rectifier 82.

The anodes 83 and 84 of the full wave rectifier 82 are connected together and to the corresponding anodes of the full wave rectifiers 82$a$ and 82$b$ in the rectifier systems 69$a$ and 69$b$, respectively, corresponding to the other two color channels, and also to the input terminals of a compression network 85 which may be of the type disclosed in the copending application of William West Moe, Serial No. 763,050, filed July 23, 1947, now Patent No. 2,581,124, for Compression Network. The compressor network 85 is preferably so designed that the relation between its output and input is in accordance with the following equation:

$$\text{Output}=1-\frac{1}{\text{Input}} \qquad (5)$$

The output of the compressor network 85 is supplied through a conductor 86 to one terminal of a potentiometer 87 (Fig. 3) in the modulator system 16, the other terminal of the potentiometer 87 being grounded at 88. The movable contact 89 of the potentiometer 87 is connected to the No. 1 grid 90 of the modulator tube 15, as shown.

The modulator network 16 is preferably designed so that the relation between its output and its input is in accordance with the following equation:

$$\text{Output}=\text{constant}\times\text{input to grid } \mathbf{14} \times(1-\text{input to grid } (\mathbf{90})) \qquad (6)$$

and the modulators 16$a$ and 16$b$ are similarly designed.

With the rectifiers 69, 69$a$ and 69$b$ connected as shown in Fig. 4, it will be understood that the input to the compressor 85 at any instant will be proportional to only the largest (I color max.) of the three signals corresponding to the three subtractive primaries. Hence, from Equation 5, the output from the compressor 85 will be:

$$\text{Output}=1-\frac{1}{I\ \text{color max.}} \qquad (7)$$

and the output from the modulator system will be:

$$\text{Output}=\text{constant}\times I\ \text{uncorrected}\times\left[1-\left(1-\frac{1}{I\ \text{color max.}}\right)\right]$$
$$=\text{constant}\ \frac{I\ \text{uncorrected}}{I\ \text{color max.}} \qquad (8)$$

which is the same as Equation 4 above.

In similar fashion, the output of the compressor network 85 is supplied to the No. 1 grids of the modulator tubes in the modulator systems 16$a$ and 16$b$ corresponding to the magenta and cyan channels, respectively. Thus, the currents supplied to the three glow lamps 27, 27$a$ and 27$b$ will all be corrected in accordance with Equation 4 above, and the corresponding separation negatives 28, 28$a$ and 28$b$ will be in accordance with the four color reproduction theory explained above.

As shown in Fig. 4, the cathodes 91 and 92 of the full wave rectifier 79 are connected to the corresponding cathodes of the corresponding full wave rectifiers in the rectifier systems 69*a* and 69*b* and also by a conductor 93 to the input terminals of a glow lamp control 94. The glow lamp control 94 may be of the same general type as the controls 26, 26*a* and 26*b* except that no means is provided for limiting the maximum value of the current supplied to the glow lamp 95 which exposes the black color separation negative 96.

While the electronic system described above for preparing color separation negatives for four color reproductions is satisfactory, it has been found that somewhat more pleasing results are obtained in the final print if only a certain fraction of the so-called "under" colors is removed from the original and printed as black so that some of each of the colored inks corresponding to the three subtractive primaries are left in each area. This situation is represented in Fig. 2 by the points $C_3$, $M_3$ and $Y_3$ which correspond to arbitrary cyan, magenta and yellow ink densities for a typical case. Thus, in reproducing the color represented by the graphs shown in Figs. 1*a* and 1*b* by a modified four color system of this type, the density of the cyan image might be increased to a value between what it would be in a simple three color process and the maximum value shown in Fig. 2. For this situation. the amount by which all densities are increased is given by the following equation:

$$D\text{ corrected}=D\text{ uncorrected}+n\,(D\text{ max.}-D\text{ color max.})\quad(9)$$

where $n$ is the fractional amount by which the density of the color having maximum density in the negative is to be increased toward the maximum negative density. It will be observed that where $n=0$, there is no increase in the densities of the colors and the three color process obtains. At the other extreme, if $n=1$, the color having maximum density in the negative is increased to the maximum and a full four color reproduction system of the type shown in Figs. 3 and 4 obtains.

It will be apparent that Equation 4 above can be modified in view of Equation 9 as follows:

$$I\text{ corrected}=\frac{I\text{ uncorrected}\times I\text{ max.}^n}{I\text{ color max.}^n}\quad(10)$$

where $n$ can have any value between 0 and 1.

Since the black printer must print an amount of black equal to the amount by which the colored inks are decreased, the density of the black negative must be decreased by an amount $$\Delta D=n\,(D\text{ max.}-D\text{ color max.})$$

and the density of the black negative must be in accordance with the following relation:

$$D\text{ black}=D\text{ max.}-n\,(D\text{ max.}-D\text{ color max.})\quad(11)$$

which, when combined with Equation 3 above reduces to:

$$I\text{ black}-\frac{I\text{ max.}\ I\text{ color max.}^n}{I\text{ max.}^n}\quad(12)$$

If $n$ is assigned a value of 0.5, for example, Equation 12 above has the following value:

$$I\text{ black}=I\text{ max. }0.5\times I\text{ color max. }0.5\quad(13)$$

For the maximum color signal, $$I\text{ uncorrected}=I\text{ color max.}$$

Hence, for this signal and for $n=0.5$ Equation 10 can be modified to:

$$I\text{ corrected}=I\text{ max. }0.5\times I\text{ color max. }0.5$$

which is the same as Equation 13 above.

For this special case, therefore, the final corrected color signal of maximum value can be employed to control the glow lamp or other device for exposing the black separation negative, thus enabling considerable simplification of the apparatus to be effected. Apparatus designed for this purpose is shown in greater detail in Fig. 5 of the drawings.

Figure 5:
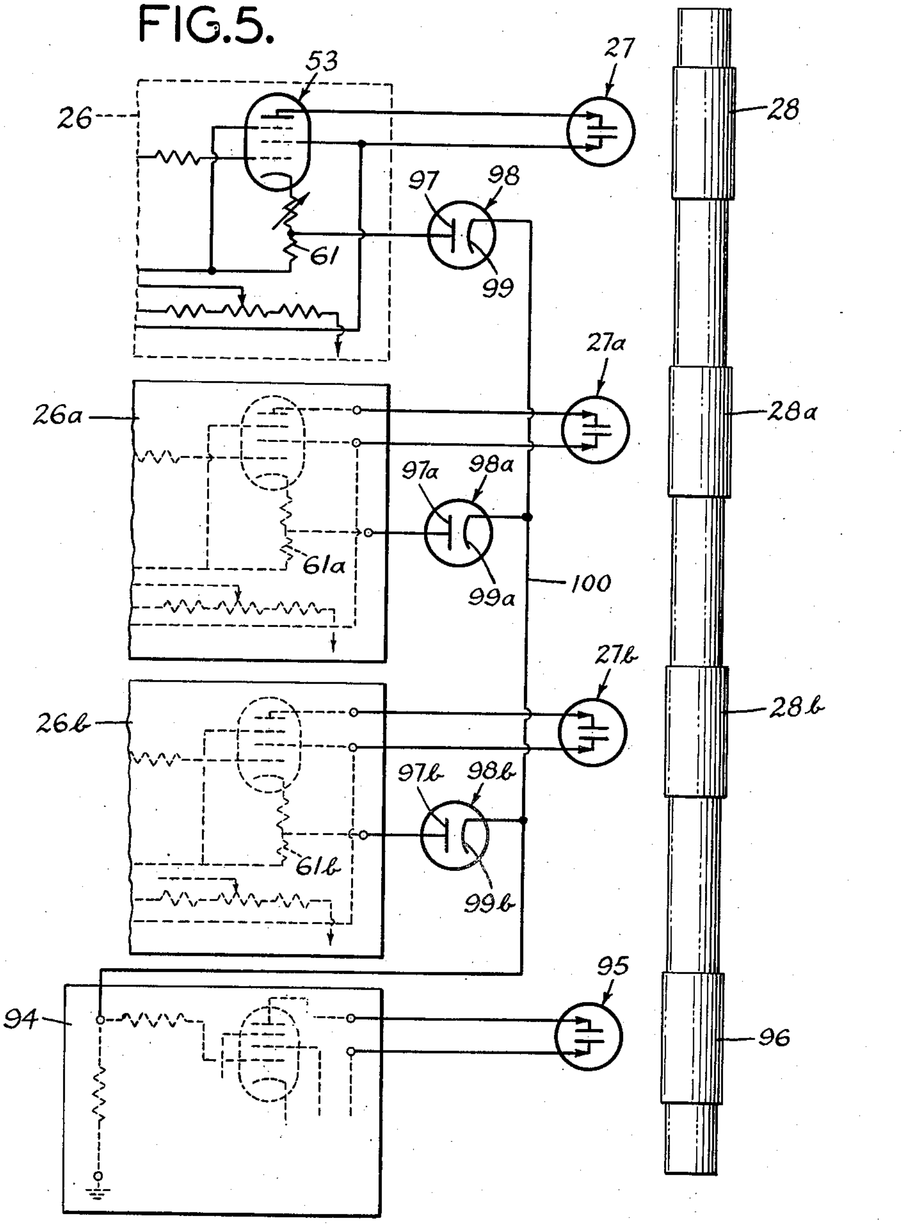
Fig. 5 illustrates schematically a simplified form of the invention.

Referring now to Fig. 5, the D. C. voltages appearing across the cathode biasing resistors 61, 61*a* and 61*b* in the three glow lamp controls 26, 26*a* and 26*b* are supplied to the anodes 97, 97*a* and 97*b*, respectively, of conventional half wave rectifiers 98, 98*a* and 98*b*, respectively. The cathodes 99, 99*a* and 99*b* of the rectifiers 98, 98*a* and 98*b*, respectively, are tied together by a conductor 100 which is also connected to an input terminal of the glow lamp control 94 which supplies current to energize the glow lamp 95 for exposing the black separation negative 96. As indicated, the output from the rectifiers 98, 98*a* and 98*b* will be proportional at any instant to the maximum of the three signal outputs from the glow lamp controls 26, 26*a* and 26*b*.

In the Fig. 5 embodiment, it will be understood that the compressor network 85 (Fig. 4) should be properly designed to provide an output given by:

$$\text{Output}=\left(1-\frac{1}{I\text{ color max.}^n}\right)$$

Also, the limiter networks comprising the voltage regulator tubes in the glow lamp controls 26, 26*a* and 26*b* should be suitably constructed to limit the glow lamp currents to I $\text{max.}^n$ so that operation will be in accordance with Equation 10 above.

From the foregoing, it will be understood that the invention provides new and improved electronic systems for preparing color separation negatives for printing four color reproductions which is simple and highly effective in operation. It will be understood that printing plates made from color separation negatives obtained in accordance with the invention will be substantially in accordance with theoretical requirements so that color prints of high quality can be produced.

It will be further understood that while the scale of the black separation negative itself is changed to correspond to the calue of $n$ this is only for convenience. Obviously, if the black separation negative were developed photographically to a higher $\gamma$ it would correspond to the proper black separation negative for a higher value of $n$.

The several representative embodiments described above and illustrated in the drawings are susceptible of considerable modification in form and detail within the scope of the following claims, as will be apparent to those skilled in the art.

We claim:

1. In a method of making reproductions in color of a colored original, the steps of scanning said original to provide electric currents representative of variations in three primary color components, respectively, selecting the instantaneous maximum of said currents, electrically dividing each of said electric currents by a function of a power less than one of said maximum current, and utilizing the respective varying quotient currents as values definitive of color components to be reproduced to control the operation of color reproduction means.

2. In a method of making reproductions in color of a colored original, the steps of scanning said original to provide electric currents representative of variations in three primary color components, respectively, selecting the instantaneous maximum of said currents, electrically dividing each of said electric currents by a function of a power less than one of said maximum current, providing color separation negatives corresponding to said primary color components, and exposing said negatives as a function of variations in said respective modified electric currents and in synchronism with the scanning of said colored original.

3. In a method of making reproductions in color of a colored original, the steps of scanning said original to provide electric currents representative of variations in three primary color components, respectively, continuously selecting the instantaneous maximum of said currents, electrically dividing said electric currents by a function of a power less than one of said maximum current, providing color separation negatives corresponding to said primary color components and black, exposing the negatives corresponding to said primary color components as a function of said respective modified currents and in synchronism with the scanning of said colored original, and exposing the black negative in accordance with a function of the instantaneous maximum of said currents and in synchronism with the scanning of said colored original.

4. In a method of making reproductions in color of a colored original, the steps of scanning said original to provide electric currents representative of variations in three primary color components, respectively, selecting the instantaneous maximum of said currents, electrically dividing each of said electric currents by a function of the one-half power of said maximum current to produce corrected currents defined by the equation:

$$I \text{ corrected} = \frac{I \text{ uncorrected} \times I \text{ max.}^{.5}}{I \text{ color max.}^{.5}}$$

where I uncorrected is the current before modification, I max. is a constant, I color max. is the instantaneous maximum of said currents providing photosensitive means, and exposing said means as a function of variations in said corrected currents.

5. In apparatus for making reproductions in color of a colored original, the combination of means for scanning said original to provide electric signals representative of variations in three primary color components, respectively, means for selecting the instantaneous maximum of said signals, and means for electrically dividing each of said electric signals by a function of a power less than one of said maximum signal, to derive signals definitive of the respective color components to be present in the color reproductions.

6. In apparatus for making reproductions in color of a colored original, the combination of means for scanning said original to provide carrier signals modulated as a function of variations in three primary color components, respectively, rectifying means for rectifying only the instantaneous maximum of said modulated signals to provide a modulating signal, means for compressing said modulating signal to a fixed exponent less than one, means for modulating each of said carrier signals in accordance with a function of said modulating signal, means for demodulating said carrier signals, and means for limiting the outputs of said demodulating means to given maximum values.

7. In a system for producing reproductions in color from a colored original, the combination of scanning means providing three carrier signals modulated as a function of variations in three primary color components, respectively, rectifying means receiving said three modulated carrier signals and providing a rectified signal output representative of the instantaneous maximum of said carrier signals, means for modulating said three carrier signals as a function of the one-half power of said rectified signal output, demodulating means receiving the outputs of said modulating means and providing three signals representative of said three primary color components, a plurality of photographic negatives, illuminating means responsive to the outputs of said demodulating means for exposing three of said negatives, respectively, second rectifying means connected to said demodulating means for providing a signal output representative of the maximum of the three signal outputs therefrom, and illuminating means responsive to the output of said second rectifying means for exposing another of said negatives.

8. In a system for producing reproductions from an original, the combination of means for scanning said original to produce electric signals representative of variations in a color of said original, a photosensitive area, means for exposing said area in synchronism with the scanning of said original, an electric channel connecting said scanning means and said exposing means, and means for limiting the intensity of the exposure effected by said exposing means to a predetermined extreme value corresponding to a desired minimum or maximum density for said photosensitive area.

9. In a system for producing reproductions in color from a colored original, the combination of scanning means providing three signals representative of variations in three primary color components, respectively, a plurality of photosensitive areas, a plurality of means for exposing said respective photosensitive areas in synchronism with the scanning of said original, a plurality of electric channels receiving said respective signals and providing outputs for actuating said respective exposing means, and a plurality of means for limiting the intensities of the exposures effected by said respective exposing means to a common predetermined extreme value corresponding to a desired minimum or maximum density for said photosensitive areas.

10. In a method of making reproductions in color of a colored original, the steps of scanning elemental areas of a colored original, producing a plurality of carrier signals modulated, respectively, in accordance with different color components of said elemental areas of the original, selecting the instantaneous maximum modulation component of said modulated carrier signals, modifying each of said modulated carrier signals as a function of the reciprocal of a power less than one of said instantaneous maximum modulation component, and exposing a plurality of photosensitive areas in accordance with the modulation components of said modified modulated carrier signals, respectively, and in synchronism with the scanning of said original.

11. In a method of making reproductions in color of a colored original, the steps of scanning elemental areas of a colored original, producing a plurality of carrier signals modulated, respectively, in accordance with different color components of said elemental areas of the original, selecting the instantaneous maximum modulation component of said modulated carrier signals, modifying each of said modulated carrier signals as a function of the reciprocal of a power less than one of said instantaneous maximum modulation component, exposing a plurality of photosensitive areas in accordance with the modulation components of said modified modulated carrier signals, respectively, in synchronism with the scanning of said original, and exposing another photosensitive area in accordance with said instantaneous maximum modulation component of the modulated carrier signals.

12. In a method of making reproductions in color of a colored original, the steps of scanning elemental areas of a colored original, producing a plurality of carrier signals modulated, respectively, in accordance with different color components of said elemental areas of the original, selecting the instantaneous maximum modulation component of said modulated carrier signals, modifying each of said modulated carrier signals as a function of the reciprocal of the one-half power of sand instantaneous maximum modulation component, exposing a plurality of photosensitive areas in accordance with the modulation components of said modified modulated carrier signals, respectively, in synchronism with the scanning of said original and exposing another photosensitive area in accordance with the instantaneous maximum modulation component of said modified modulated carrier signals, in synchronism with the scanning of said original.

13. In a method of making reproductions in color of a colored original, the steps of scanning elemental areas of a colored original, producing a plurality of carrier signals modulated, respectively, in accordance with different color components of said elemental areas of the original, selecting the instantaneous maximum modulation component of said modulated carrier signals, modifying each of said modulated carrier signals as a function of the reciprocal of a power less than one of said instantaneous maximum modulation component, exposing a plurality of photosensitive areas in accordance with the modulation components of said modified modulated carrier signals, respectively, in synchronism with the scanning of said original, and limiting the intensity of exposure of each of said respective photosensitive areas to a predetermined extreme value corresponding to a desired maximum or minimum density therefor.

14. In a method of making reproductions in color of a colored original, the steps of scanning elemental areas of a colored original, producing a plurality of carrier signals modulated, respectively, in accordance with different color components of said elemental areas of the original, selecting the instantaneous maximum modulation component of said modulated carrier signals, modifying each of said modulated carrier signals as a function of the reciprocal of the one-half power of said instantaneous maximum modulation component, exposing a plurality of photosensitive areas in accordance with the modulation components of said modified modulated carrier signals, respectively, in synchronism with the scanning of said original, limiting the intensity of exposure of each of said respective photosensitive areas to a predetermined extreme value corresponding to a desired maximum or minimum density therefor, and exposing another photosensitive area in accordance with the instantaneous maximum modulation component of said modified modulated carrier signals, in synchronism with the scanning of said original.

15. In apparatus for making reproductions in color of a colored original, the combination of means for scanning elemental areas of an original to provide carrier signals modulated as functions of variations in three primary color components, respectively, of said elemental areas, means for selecting the instantaneous maximum modulation component of said carrier signals, a plurality of means, each responsive to said maximum modulation component and to one of said carrier signals, for modifying each of said carrier signals as a function of the reciprocal of a power less than one of said maximum modulation component, a plurality of photosensitive areas, and means for exposing said photosensitive areas as functions of said modified modulated carrier signals, respectively, in synchronism with the scanning of said original.

16. In apparatus for making reproductions in color of a colored original, the combination of means for scanning elemental areas of an original to provide carrier signals modulated as functions of variations in three primary color components, respectively, of said elemental areas, means for selecting the instantaneous maximum modulation component of said carrier signals, a plurality of means, each responsive to said maximum modulation component and to one of said carrier signals, for modifying each of said carrier signals as a function of the one-half power of said maximum modulation component, a plurality of photosensitive areas, means for exposing certain of said photosensitive areas as functions of said modified modulated carrier signals, respectively, in synchronism with the scanning of said original, means for selecting the instantaneous maximum modulation component of said modified modulated carrier signals, and means for exposing another photosensitive area as a function of said last-named instantaneous maximum modulation component, in synchronism with the scanning of said original.

17. In apparatus for making reproductions in color of a colored original, the combination of means for scanning elemental areas of an original to provide carrier signals modulated as functions of variations in three primary color components, respectively, of said elemental areas, means for selecting the instantaneous maximum modulation component of said carrier signals, a plurality of means, each responsive to said maximum modulation component and to one of said carrier signals, for modifying each of said carrier signals as a function of the reciprocal of a power less than one of said maximum modulation component, a plurality of photosensitive areas, means for exposing said photosensitive areas as functions of said modified modulated carrier signals, respectively, in synchronism with the scanning of said original, and means for limiting the intensity of exposure of each of said respective photosensitive areas to a predetermined extreme value corresponding to a desired maximum or minimum density therefor.

18. In apparatus for making reproductions in color of a colored original, the combination of means for scanning elemental areas of an original to provide carrier signals modulated as functions of variations in three primary color components, respectively, of said elemental areas, means for selecting the instantaneous maximum modulation component of said carrier signals, a plurality of means, each responsive to said maximum modulation component and to one of said carrier signals, for modifying each of said carrier signals as a function of the one-half power of said maximum modulation component, a plurality of photosensitive areas, means for exposing said photosensitive areas as functions of said modified modulated carrier signals, respectively, in synchronism with the scanning of said original, means for limiting the intensity of exposure of each of said respective photosensitive areas to a predetermined extreme value corresponding to a desired maximum or minimum density therefor, means for selecting the instantaneous maximum modulation component of said modified modulated carrier signals, and means for exposing another photosensitive area as a function of said last-named instantaneous maximum modulation component, in synchronism with the scanning of said original.

VINCENT C. HALL.
WILLIAM W. MOE.

REFERENCES CITED

The following references are of record in the file of this patent:

UNITED STATES PATENTS

| Number | Name | Date |
|---|---|---|
| 2,231,668 | Hall | Feb. 11, 1941 |
| 2,231,669 | Hall | Feb. 11, 1941 |
| 2,249,522 | Hall | July 15, 1941 |
| 2,253,086 | Murray | Aug. 19, 1941 |
| 2,286,730 | Hall | July 16, 1942 |
| 2,413,706 | Gunderson | Jan. 6, 1947 |
| 2,415,051 | Thompson | Jan. 28, 1947 |
| 2,434,561 | Hardy | Jan. 13, 1948 |